Jan. 31, 1961    L. A. RUNTON    2,969,686
V LINK TRANSMISSION BELT
Filed March 20, 1958    2 Sheets-Sheet 1

INVENTOR
LESLIE A. RUNTON
BY
ATTORNEY

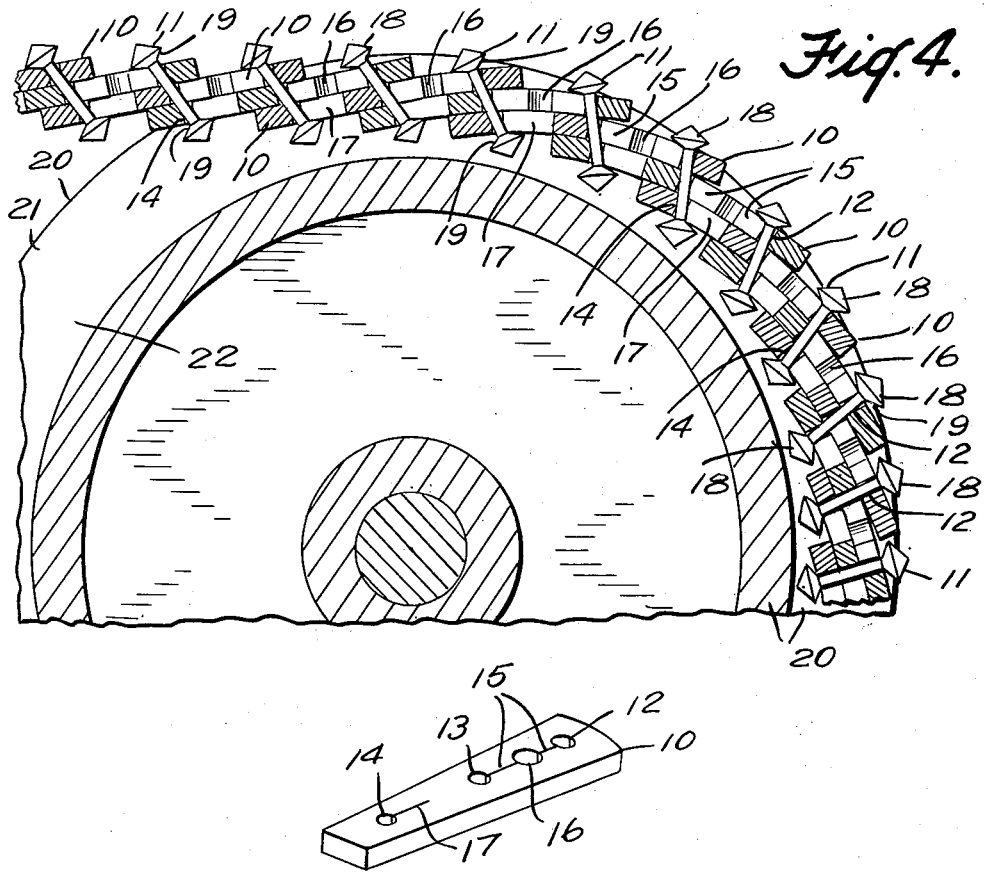

United States Patent Office 2,969,686
Patented Jan. 31, 1961

2,969,686

V LINK TRANSMISSION BELT

Leslie A. Runton, Middle Haddam, Conn., assignor to The Russell Manufacturing Company, Middletown, Conn., a corporation of Connecticut Filed Mar. 20, 1958, Ser. No. 722,685

2 Claims. (Cl. 74—236)

This invention relates to V type power transmission belts and more particularly to a V link belt for use in multiple grooved pulleys.

An object is to provide a V type link belt having improved dimensional stability both longitudinally and transversely.

Another object is to provide a belt of the above type having improved stud means for securing the overlapped links together.

A further object is to provide a belt of the above type which is highly resistant to transverse compression in the pulley grooves.

A still further object is to provide a belt of the above type in which the links are formed at least on their exposed surfaces of a material which is resistant to abrasion and has a low coefficient of friction so that the overlapped links can slide freely as the belt flexes to pass around the pulley.

Various other objects and advantages will be apparent as the nature of the invention is more fully disclosed.

In one embodiment of the invention each link is made from a multi-ply fabric in which at least one ply contains straight stiff fillers forming transverse columns which are resistant to axial compression, and at least one other ply includes straight continuous filament, high tensile fillers running longitudinally to impart a high resistance to longitudinal stretching. Such longitudinal fillers are preferably composed of a material having a low coefficient of friction and are exposed at the surface of the link to impart such lom friction characteristics thereto. Such a material may comprise a multifilament yarn composed of a polymeric fluorocarbon resin such as tetrafluoroethylene (Teflon). This material is characterized by high tensile strength and a high degree of dimensional stability, abrasion resistance and a very low coefficient of friction.

Successive links are secured by studs extending loosely through the overlapped links and having heads shaped to grip and clamp the fabric for locking the links together when the studs are shifted into inclined position due to the tension of the belt.

The specific nature of the invention will be better understood from the following description, taken in connection with the accompanying drawings in which a particular embodiment has been set forth for purposes of illustration.

In the drawings:

Fig. 4 is a longitudinal section through a portion of a belt embodying the invention illustrating the change in position of studs as the belt flexes around the pulley; and Fig. 5 is a perspective view of a link from which the belt is formed.

Figure 1:
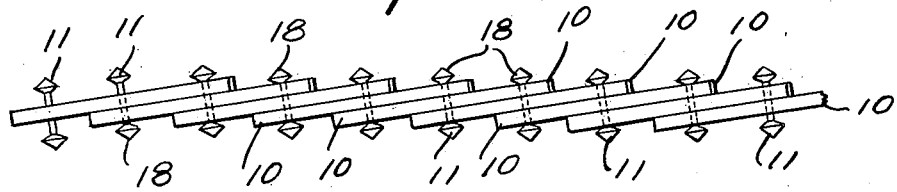
Fig. 1 is a side elevation of a portion of a V link belt embodying the invention.

Referring to the drawings more in detail, the belt is shown as composed of a plurality of links 10 which overlap and are secured together by studs 11. Each link 10, as illustrated in Fig. 5 is composed of a flat fabric strip having three holes 12, 13 and 14 to receive successive studs 11.

The leading hole 12 (in the direction of belt travel) and the center hole 13 are joined by a slit 15 having an enlarged opening 16 midway of its length through which the stud may be passed for assembling the belt. One stud 11 is passed through this opening 16 and passed along the slit 15 to the leading hole 12 and a second stud 11 is passed through the opening 16 and passed along the slit 15 to the center hole 13.

The hole 14 at the trailing end of the link is provided with a short slit 17 to facilitate the insertion of a stud 11.

Before assembly a stud 11 is inserted in the hole 14 of each link and is then passed through the openings 16 of the successive overlapped links to build up the endless belt as illustrated in Figs. 1 and 4.

Each stud 11 is formed with heads 18 having under surfaces 19 which are in the form of a truncated cone the radii of which extend at a predetermined angle, for example, an angle of 38°, with respect to a normal to the axis of the stud. The angle selected will be such that when the studs 11 assume an inclined position due to the tension of the belt as shown in Fig. 4 the surfaces 19 of the heads 18 extend parallel to the surface of the links and tend to exert a compressive force on the fabric for securing the overlapped links together. The angle of tilt of the studs will depend upon the compressibility of the fabric and the length of the studs with respect to the thickness of the links. When the compression of the fabric by the links balances the force exerted by the heads 18 of the studs due to the pull of the belt no further displacement can take place.

It will be noted that the studs 11 are free to shift in position to accommodate the variation in overlap of the inner and outer links as the belt flexes to pass around a pulley 20 as seen in Fig. 4. The tilt of the studs 11 becomes less as the belt flexes. However, because the heads 18 are not fixed to a link, the change in tilt does not cause the adjacent part of the link to bend nor does the head rub on the fabric to cause wear.

Figure 2:
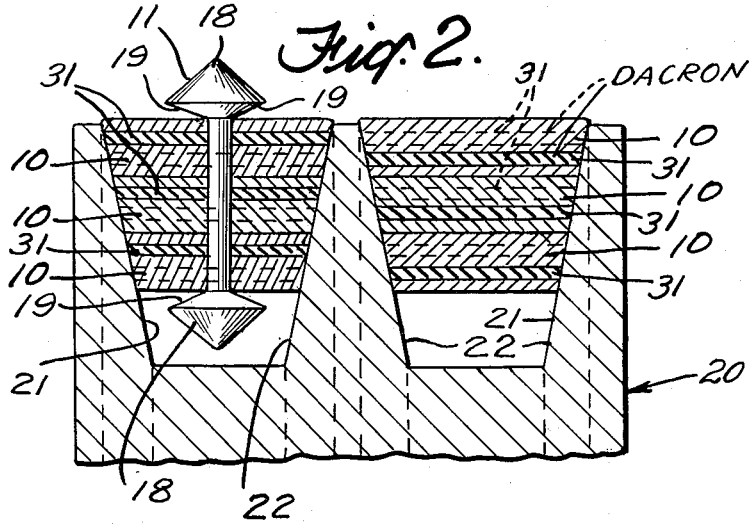
Fig. 2 is a transverse section through a portion of a pulley showing a pair of belts in driving position in pulley grooves.
Figure 3:
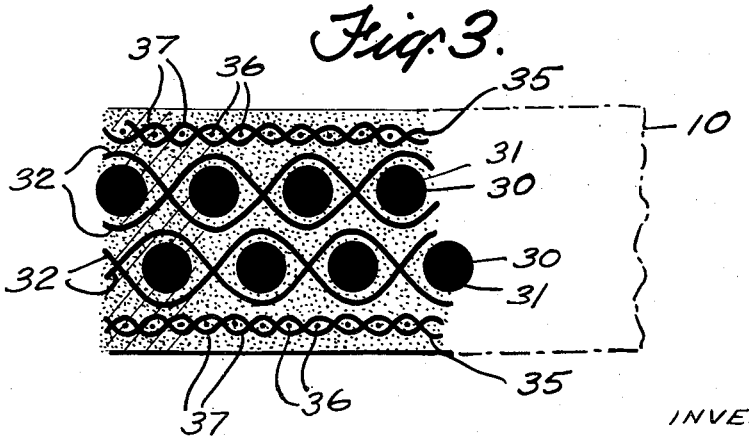
Fig. 3 is a detail view of the fabric weave.

Fig. 2 shows the relative position of a pair of such belts in V grooves 21 of a pulley 20 where the driving force is due to the grip of the inclined sides 22 of the pulley which define the grooves 21.

Each link 10 is made from a molded and heat curled resin-impregnated fabric composed of a plurality of woven plies 30 consisting of straight, stiff, compression resistant fillers 31 of heat-set nylon or Dacron monofilament or of other synthetic resins of large denier woven with thin flexible chain warps 32 of a material such as cotton, spun Dacron or spun Orlon which is bondable to the impregnant. The plies 30 form the inner ply or plies of the fabric.

Outer plies 35 are composed of straight continuous filament fillers 35 of high tensile, heat-set material such as Teflon or Dacron woven with flexible chain warps 37 of bondable material similar to the warps 32. When the fillers 36 are composed of a polymeric fluorocarbon resin such as Teflon which is not bondable to the bonding resin the chain warps 37 may be composed of cotton or other material which is readily bondable to the bonding resin and which serves to hold the nonbondable filler yarns in place to constitute the exposed surface of the link.

The woven plies are impregnated with an elastomeric resin forming impregnant such as a rubber latex or polyvinyl chloride and dried and heat cured to a degree to stabilize the fillers. The plies are then superimposed with the fillers 31 running transversely and the fillers 36 running longitudinally to build the fabric up to the desired thickness and vulcanized or cured under heat and pressure to form a multi-ply fabric in which the various plies are bonded together by the impregnant. The links 10 are cut from this fabric.

The number of inner plies 30 depends upon the desired transverse compression resistance of the links. The number of outer plies may also be varied and in the case of a plurality of such plies the filler yarns 36 of all except the surface ply may be composed of Dacron or other material which is readily bondable, the filler yarns 36 of the outer plies only being composed of Teflon.

The various rows of fillers 31 form transverse columns which are highly resistant to axial crushing and impart compression resistance to the links.

The outer plies 35 impart longitudinal stretch resistance to the links 10.

Since the stiff fillers 31 run transversely only and the chains 32 of the plies 30 and the fillers 36 of the plies 35 which run longitudinally are flexible, the links readily flex to pass around the pulleys but retain their transverse stability to an extent to resist distortion in the pulley grooves. The low friction surface of the links reduces wear and thereby increases the useful life of the belt as well as its ability to flex readily about pulleys of small radius.

Although a specific embodiment has been described for purposes of illustration the invention may be adapted to various uses and various embodiments will be apparent to a person skilled in the art.

What is claimed is:

1. A V link belt comprising a plurality of links secured together in overlapping relationship, each link being composed of a multi-ply fabric having inner and outer plies impregnated with an elastomeric molded resin, said inner plies being composed of straight stiff monofilament fillers composed of a synthetic resin forming transverse columns resistant to axial compression and flexible chain warps woven with said fillers to bind the latter in place, said outer plies being composed of longitudinally extending continuous filament filler yarns woven with flexible chain yarns of a material which is readily bondable to said resin.

2. A V link belt comprising a plurality of links secured together in overlapping relationship, each link being composed of a multi-ply fabric having inner and outer plies impregnated with an elastomeric molded resin, said inner plies being composed of straight stiff monofilament fillers composed of a synthetic resin forming transverse columns resistant to axial compression and flexible chain warps woven with said fillers to bind the latter in place, said outer plies being composed of longitudinally extending continuous filament filler yarns composed of tetrafluoroethylene woven with flexible chain yarns of a material which is readily bondable to said resin, said last filler yarns being exposed to provide a surface having low friction characteristics.

References Cited in the file of this patent

UNITED STATES PATENTS

| | | |
|---|---|---|
| 2,135,057 | Slayter et al. | Nov. 1, 1938 |
| 2,189,049 | Ungar | Feb. 6, 1940 |
| 2,444,903 | Van Buren | July 6, 1948 |
| 2,684,315 | Spicer | July 20, 1954 |
| 2,773,781 | Rodman | Dec. 11, 1956 |
| 2,792,319 | Fihe | May 14, 1957 |
| 2,840,881 | Bateman | July 1, 1958 |
| 2,848,901 | Groff | Aug. 26, 1958 |

FOREIGN PATENTS

| | | |
|---|---|---|
| 741,708 | Germany | Nov. 15, 1943 |